April 12, 1932.  R. J. OLANDER  1,853,696
SHOCK ABSORBING MECHANISM
Filed Oct. 23, 1930
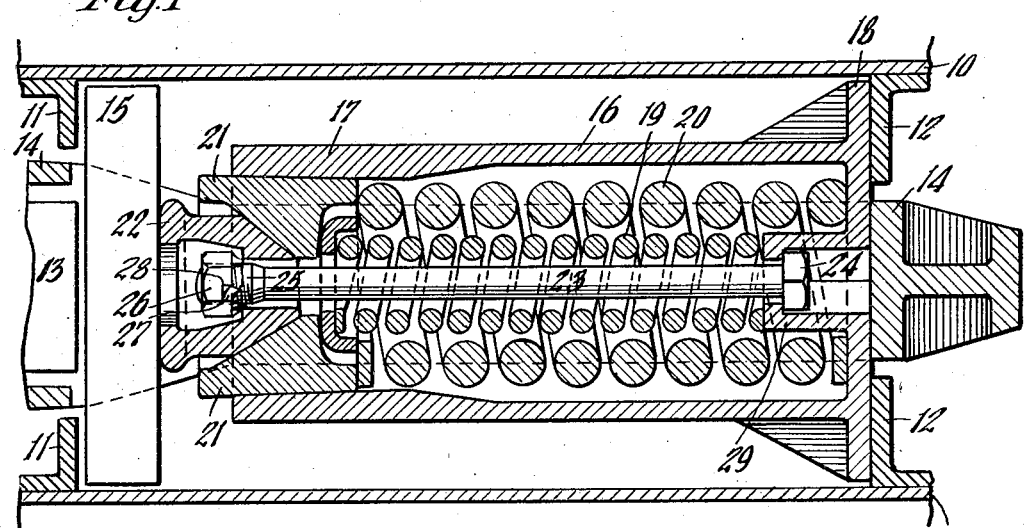
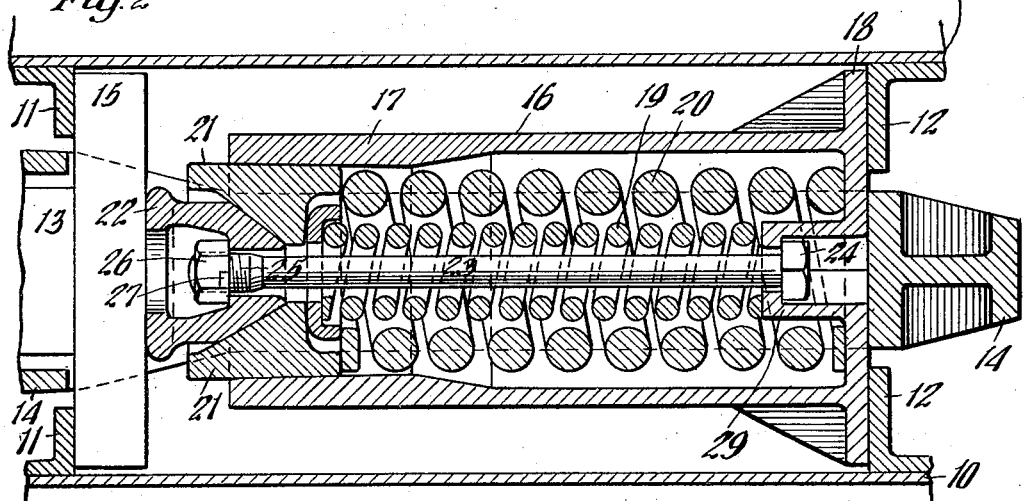
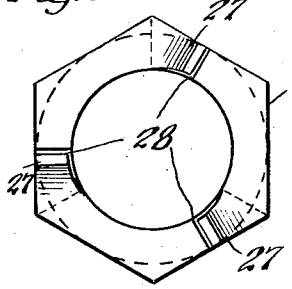
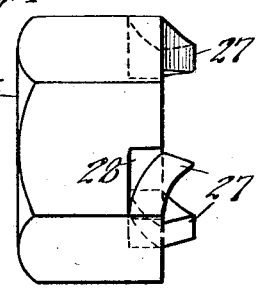
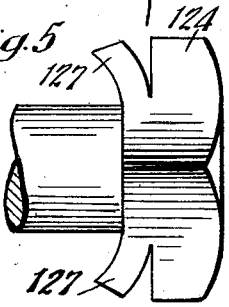
Witness
Wm. Geiger
Inventor
Roland J. Olander
By Joseph Harris
His Atty.

Patented Apr. 12, 1932

1,853,696

UNITED STATES PATENT OFFICE

ROLAND J. OLANDER, OF CHICAGO, ILLINOIS, ASSIGNOR TO W. H. MINER, INC., OF CHICAGO, ILLINOIS, A CORPORATION OF DELAWARE

SHOCK ABSORBING MECHANISM

Application filed October 23, 1930. Serial No. 490,607.

This invention relates to improvements in shock absorbing mechanisms.

One object of the invention is to provide in a shock absorbing mechanism, for railway draft riggings, simple and efficient retaining means for temporarily holding the shock absorbing mechanism under slight initial compression, thereby reducing the over-all length thereof while being assembled between the stop members of the draft sills of a car so as to facilitate entrance of the same between the stop members, said means permitting expansion of the shock absorbing mechanism to normal over-all length after a few compressions of the same, and thereafter, at all times, maintaining the shock absorbing mechanism of predetermined maximum uniform over-all length.

A more specific object of the invention is to provide a retaining means of the character indicated in the preceding paragraph, headed at opposite ends, wherein the head members are adapted to have shouldered engagement with the relatively movable parts of the shock absorbing mechanism to hold the same assembled, and wherein at least one of said head members has an offset portion normally in said shouldered engagement for holding the shock absorbing mechanism slightly compressed during assembling thereof between the stop means of the railway draft rigging, said offset portion being deformed or flattened out upon operation of the mechanism in service, to an extent to permit said shock absorbing mechanism to expand to not greater than a predetermined over-all length.

Other objects of the invention will more clearly appear from the description and claims hereinafter following.

In the drawings, forming a part of this specification, Figure 1 is a horizontal, longitudinal, sectional view through the underframe structure of a railway car, illustrating my improvements in connection therewith, the shock absorbing mechanism being illustrated in slightly contracted form. Figure 2 is a view similar to Figure 1 illustrating the shock absorbing mechanism in the normal full release position and held of predetermined over-all length. Figure 3 is an enlarged, elevational view of a nut member employed in connection with my improved retaining means for the shock absorbing mechanism. Figure 4 is a side elevational view of the nut member shown in Figure 3. And Figure 5 is a view illustrating another embodiment of the invention, showing the head portion of the retaining bolt employed.

In said drawings, referring first to the embodiment of the invention illustrated in Figures 1 to 4 inclusive, the draft sills of a railway car are designated by 10—10, these sills being provided with the usual front and rear stop lugs 11—11 and 12—12, fixed to the inner faces of the sills 10. The inner end portion of the coupler shank of the railway draft rigging is designated by 13 and a hooded yoke 14 of well known form is connected thereto in the usual manner. A front main follower 15 and a shock absorbing mechanism 16 embodying my improvements are disposed within the yoke in the usual manner.

Although my improved retaining means is capable of employment with any well known type of shock absorbing mechanism, comprising relatively movable members having spring means resisting approach thereof to cushion shocks, in the present instance the improved retaining means is illustrated as employed in connection with a friction shock absorbing mechanism. The shock absorbing mechanism 16 illustrated in the drawings, includes a friction shell 17 having an enlarged rear end portion 18 cooperating with the rear stop lugs 12—12. The shell 17 contains the usual spring resistance means, comprising inner and outer coils 19 and 20. A plurality of friction shoes 21—21 have frictional engagement with the inner surfaces of the walls of the shell 17 and a wedge block 22 has wedging engagement with the shoes in the usual manner. The wedge block 22 cooperates with the front main follower 15. My improved retaining means for holding the shock absorbing mechanism assembled and maintaining the same of uniform over-all length in service consists of a retainer bolt 23 headed at the rear end, as indicated at 24, and threaded at the outer end, as indicated at 25. As clearly shown in Figures 1 and 2, the threaded end 25 of the bolt is enlarged in a cross sectional area to strengthen the bolt at this point. A retaining nut 26 is secured to the threaded end 25 of the bolt. As shown most clearly in Figures 3 and 4, the nut 26 is of hexagonal form and has a plurality of inwardly offset lugs or projecting fingers 27—27 at the inner end thereof. As shown in the present instance, the lugs or fingers 27—27 are preferably three in number and are equally spaced apart. The lugs 27—27 are formed by splitting or cutting the metal thereof from the nut proper, as clearly indicated in Figure 4, the metal forming the lugs being then bent to the position shown. As will be evident, the lugs 27 form bendable or deformable projections which when subject to impact may be bent backwardly and forced into the recesses 28—28 from which they are cut.

When the mechanism is first assembled, the retainer bolt is applied by inserting the same through the rear end of the friction shell 17 and after the spring, friction shoes and wedge have been assembled with the shell the nut 26 is threaded on the outer end of the bolt. The nut is screwed down to such an extent that the distance between the inner face of the nut proper and the inner face of the head 24 of the bolt is such as to permit the maximum expansion of the friction shock absorbing mechanism, in full release, to the predetermined over-all length desired, as clearly shown in Figure 2. As will be evident, when the nut is first applied, the same will hold the friction shock absorbing mechanism in the slightly reduced condition shown in Figure 1, the projections or lugs 27—27 of the nut, contacting with the abutment face of the wedge block, holding the same in the position shown in Figure 1, that is spaced inwardly slightly from the final predetermined position shown in Figure 2. As will be evident, when the friction shock absorbing mechanism is thus held of reduced over-all length, the same may be readily applied between the stop lugs of the draft sills, as sufficient clearance is had for easy insertion between the stop lugs without employing a special tool or device for temporarily holding the mechanism slightly compressed. After the shock absorbing mechanism has been applied, as shown in Figure 1, and is used in service, a few compressions of the shock absorbing mechanism will suffice to flatten the projections or lugs 27—27 into the openings 28 of the nut, thereby permitting the nut to have shouldered engagement directly with the abutment face of the wedge member and allowing the shock absorbing mechanism to expand to the predetermined over-all maximum length, as shown in Figure 2. It is pointed out in this connection that during each actuation of the shock absorbing mechanism, the wedge will be forced inwardly, thereby forcing the friction shoes inwardly also against the resistance of the springs 19 and 20. When the actuating force is reduced and the shock absorbing mechanism is permitted to expand, the recoil of the springs will force the friction shoes and wedge block outwardly, and impact of the latter with the projecting lugs 27 of the nut 26 will deform the same and bend them toward the nut 26. As will be evident, a few repetitions of this operation will completely flatten the lugs 27 so that the outer faces thereof will be in alinement with the rear face of the nut proper.

Referring next to the embodiment of the invention illustrated in Figure 5, the arrangement is similar to that described in connection with Figures 1 to 4 inclusive, with the exception that an ordinary nut is employed in connection with the retainer bolt and the head of the bolt, which is indicated by 124 in Figure 5, is provided with offset or projecting deformable lugs 127—127 which are flattened out so as to permit expansion of the shock absorbing mechanism to the maximum predetermined over-all length desired. As shown in Figure 5, the head of the bolt is of square form and has the lugs 127—127 formed at diametrically opposed corners thereof, the metal forming the lugs 127 being cut away or split from the head 124 of the bolt and bent inwardly, as shown. When the mechanism is assembled, the offset or projecting lugs 127—127 have shouldered engagement with the abutment face on the rear end portion of the friction shell of the shock absorbing mechanism. As will be understood, the head of the bolt cooperates with an inwardly projecting hollow boss on the rear wall of the shell, similar to the boss 29, shown in Figure 1. Upon a few compressions of the mechanism in service, due to the force exerted by the springs in restoring the mechanism to the full released condition, the abutment face of the shell will be repeatedly forced against the lugs 127, and the impact thereof with the lugs will bend the same to such an extent that the end faces thereof will be brought into alinement with the inner end face of the head of the bolt. The shock absorbing mechanism is thus permitted, after a few compressions thereof in service, to assume the predetermined maximum over-all length and is maintained of such predetermined over-all length thereafter.

From the preceding description taken in connection with the drawings, it will be evident that I have provided a simple and efficient retaining means by which the shock absorbing mechanism is temporarily held of lesser over-all length than the predetermined over-all length thereof in full release, whereby the same may readily be assembled between the stop means of the railway draft rigging without the employment of any auxiliary clamping or holding means, the retaining means being automatically adjusted in service after a few compressions of the mechanism to permit full expansion of the shock absorbing mechanism to the predetermined over-all length and maintaining the same of such length at all times thereafter.

I have herein shown and described what I now consider the preferred manner of carrying out my invention, but the same is merely illustrative and I contemplate all changes and modifications that come within the scope of the claims appended hereto.

I claim:

1. In a shock absorbing mechanism for railway draft riggings, the combination with yieldingly resisted, relatively movable members adapted to absorb shocks upon relative approach thereof; of retaining means for limiting the relative separation of said members and maintaining said mechanism of maximum uniform over-all length, said means including displaceable means for initially temporarily holding said mechanism of lesser over-all length than said maximum length to facilitate application thereof to said draft rigging, said last named means being displaceable and rendered ineffective through the action of said mechanism upon a few compressions thereof, thereby permitting the same to assume said maximum over-all length.

2. In a shock absorbing mechanism for railway draft riggings, the combination with yieldingly resisted, relatively movable members adapted to resist shocks upon relative approach thereof; of retaining means for limiting relative separation of said members and maintaining the mechanism of predetermined, uniform over-all length in full release, said means including a deformable element for temporarily holding said shock absorbing mechanism slightly contracted when initially assembled, thereby reducing the over-all length thereof to less than said predetermined length, said means being deformed upon a few actuations of said shock absorbing mechanism in service to permit expansion of the same to said predetermined over-all length.

3. In a friction shock absorbing mechanism, for railway draft riggings, the combination with yieldingly resisted, relatively movable members, adapted to oppose and cushion shocks upon relative approach thereof; a retaining element having enlarged portions at opposite ends thereof having shouldered engagement with both of said members for limiting relative separation thereof and maintaining the mechanism of predetermined, uniform over-all length; and deformable means initially slightly spacing one of said members from the shoulder formed by the cooperating enlargement, said means being deformed by a few impacts of said last named member therewith in service, to permit expansion of said mechanism to said predetermined over-all length, and engagement of said member and enlargement to positively limit the expansion of said shock absorbing mechanism to said predetermined over-all length.

4. In a friction shock absorbing mechanism for railway draft riggings, the combination with a pair of yieldingly resisted, relatively movable members adapted to oppose and cushion shocks upon relative approach thereof; of a retaining element having enlarged portions at opposite ends adapted to have shouldered engagement with said members respectively, said enlargements being spaced apart such a distance as to limit relative separation of said members to the predetermined full compression stroke of the mechanism, one of said enlarged portions having a bendable lug formed thereon for initially holding the corresponding member slightly spaced therefrom, to temporarily slightly reduce the over-all length of said mechanism, said bendable lug being deformed by a few impacts therewith of the corresponding movable member of the shock absorbing mechanism, thereby displacing said bendable lug to an extent to permit engagement of said last named member with the shoulder of the corresponding enlargement of the retaining element, thus permitting expansion of said mechanism to an extent equal to said predetermined full compression stroke.

5. In a shock absorbing mechanism for railway draft riggings, the combination with a pair of relatively movable, yieldingly resisted members, adapted to oppose and cushion shocks upon relative approach thereof; of a retainer bolt for said members, said bolt being headed at one end and having a nut secured to the other end thereof, said head and nut being adapted to have shouldered engagement with said members respectively to limit relative separation thereof to a predetermined maximum extent, said nut having a deformable offset portion initially engageable with the corresponding member for temporarily holding said member slightly spaced from the nut proper to shorten said mechanism while being assembled with the draft rigging, said deformable portion being displaced by a few impacts therewith of the corresponding movable member in service, to permit expansion of said mechanism to the full predetermined extent limited by contact with said nut proper.

6. In a shock absorbing mechanism for railway draft riggings, the combination with a pair of relatively movable, yieldingly resisted members, adapted to oppose and cushion shocks upon relative approach thereof; of a retainer bolt for said members, said bolt being headed at one end and having a nut secured to the other end thereof, said head and nut being adapted to have shouldered engagement with said members respectively to limit relative separation thereof to a predetermined maximum extent, said head having a deformable offset portion initially engageable with the corresponding member for temporarily holding said member slightly spaced from the head proper to shorten said mechanism while being assembled with the draft rigging, said deformable portion being displaced by a few impacts therewith of the corresponding movable member in service, to permit expansion of said mechanism to the full predetermined extent limited by contact with said head proper.

In witness that I claim the foregoing I have hereunto subscribed by name this 18th day of October, 1930.

ROLAND J. OLANDER.